O. L. ROUTT, G. C. McCONNELL AND H. L. GLAZE.
MACHINE FOR TRANSPORTING AND DRYING PLASTER BOARD AND THE LIKE.
APPLICATION FILED APR. 15, 1919.
1,346,339.
Patented July 13, 1920.
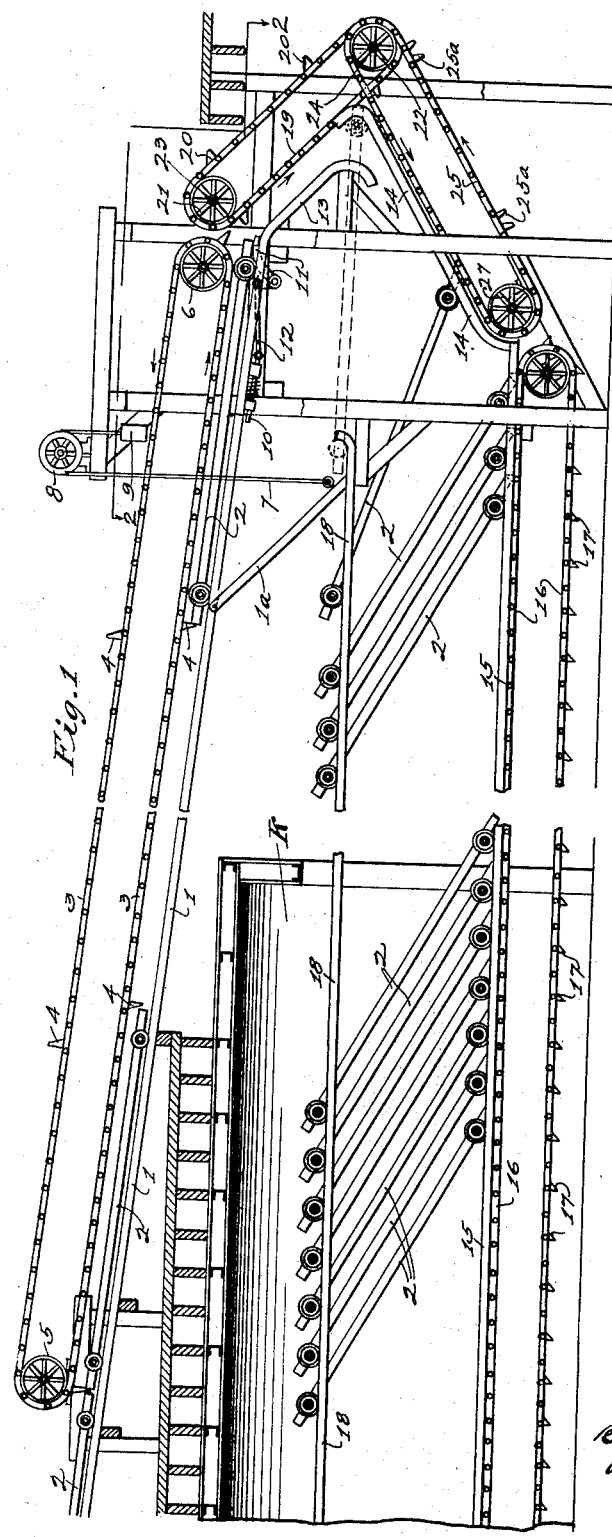
INVENTORS:
Orville L. Routt,
Grover C. McConnell,
Herbert L. Glaze,

UNITED STATES PATENT OFFICE.

ORVILLE L. ROUTT, GROVER C. McCONNELL, AND HERBERT L. GLAZE, OF LOS ANGELES, CALIFORNIA, ASSIGNORS, BY DIRECT AND MESNE ASSIGNMENTS, TO PLASTOID PRODUCTS, INC., OF LOS ANGELES, CALIFORNIA, A CORPORATION OF CALIFORNIA.

MACHINE FOR TRANSPORTING AND DRYING PLASTER-BOARD AND THE LIKE.

1,346,339.   Specification of Letters Patent.   Patented July 13, 1920.

Application filed April 15, 1919. Serial No. 291,972.

*To all whom it may concern:*

Be it known that we, ORVILLE L. ROUTT, GROVER C. MCCONNELL, and HERBERT L. GLAZE, citizens of the United States, residing in the city of Los Angeles, county of Los Angeles, and State of California, have invented certain new and useful Improvements in Machines for Transporting and Drying Plaster-Board and the like, of which the following is a specification.

Our invention relates more particularly to a method of handling and drying plaster board and the like and has among its prinpal objects to provide in combination with suitable pallets or carriers for plaster board or the like, means whereby said carriers can be continuously moved along a course of travel and during such movement be automatically changed from following each other end to end to a grouped position in which said pallets or carriers are arranged in inclined positions with their upper ends moving on one support and their lower ends moving on another support, whereby said carriers are closely positioned for drying purposes without resting one upon another.

In order to clearly describe our invention, we have shown on the accompanying sheet of drawings, one practical embodiment of means for so handling said carriers or pallets, which we will now describe. In the drawings—

Figure 1 is a longitudinal side elevation of such means, partly in section; and

Fig. 2 is a fragmentary, top plan view below the line 2—2 on Fig. 1.

Our improved method of handling pallets or carriers of the character referred to consists in moving said carriers from positions following each other end to end, to inclined positions in which they overlap each other for substantially their lengths, and doing it automatically and continuously.

In the means here shown for accomplishing this result, the pallets move down an incline, one after the other, to a position where they are automatically lowered, the rear end to one level and the forward end to another level, and then in these positions move said carriers rearwardly under the inclined way along which they have previously traveled end to end.

In the drawings, 1 designates an inclined way along which the pallets or carriers 2 are moved. Above the lower end of said inclined way is placed a moving chain 3, provided with fingers 4, here shown to be spaced substantially the length of the carriers. Said moving chain is carried and driven by two wheels, 5 and 6, driven from any suitable driving connections. Forming a part of the inclined way 1, is a drop switch 1ª, the moving end of which is connected to a cable 7, running over a pulley 8, and provided with a weight 9. A catch or latch 10 normally holds the switch end in place as a part of the inclined way, said latch being operated by means of a trip lever 11, connected therewith by means of a link 12. Said inclined way 1, at its lower end, terminates in a more pronounced inclined way, 13. It will be understood that the inclined way as here shown is made up of two track members at opposite sides of the structure, as will be clear from Fig. 2. A return inclined way 14 receives the ends of the carriers from the way 13, said return way 14 being inclined in the opposite direction, as shown, and connecting at its lower end with a rearwardly extending way 15, under and adjacent which is a moving chain 16, provided with carrier engaging fingers 17, positioned to engage the lower ends of the pallets or carriers 2, and to move them rearwardly, while the upper ends of said carriers move on the upper way 18, as clearly indicated. Mounted adjacent the short inclined way 13, is a controlling chain 19, having fingers 20, and running over wheels 21 and 22, on a shaft 23, above, and a shaft 24, below, as seen in Fig. 2. Also mounted adjacent the return inclined way 14, is a controlling chain 25, running over pulleys or wheels 26 and 27, said chain being provided with holding fingers 25ª to receive the ends of the carriers, as indicated. The shaft 23, on which the wheels 21 are mounted, is provided with a pinion 28, meshing with an intermediate gear 29, which in turn meshes with a gear 30, on shaft 31, on which wheels, 6, 6 are mounted and which drive the moving chain 3.

In the operation of the device as here shown for purposes of illustration, the pallets or carriers 2, come down the inclined way 1, as by gravity, until they reach the position of the chain wheel 5, at which point the forward end of each pallet is held by a finger 4 and the pallet is then moved with said chain 3 to the position of the pallet 2 at the lower end of the way 1. The forward end of the pallet depresses the trip lever 11 and releases the latch 10, which permits the switch section of the inclined way to drop to the position 1ᵃ, in full lines, Fig. 1, whereupon the rear end of the pallet can move down said switch member 1ᵃ to the runway 18. At the same time the forward end of the pallet is moving down the inclined way 13, under the control of the chain 19 and its fingers 20, until it reaches the return inclined way 14, as indicated in the dotted lines, Fig. 1. Here the end of the pallet or carrier is caught by the fingers 25ᵃ on the chains 25 and the pallet is moved rearwardly in the manner clearly indicated until its lower end is in position to be picked up by the fingers 17 on the moving chain 16, whereupon said pallets or carriers are moved rearwardly at regular intervals, or spaces apart, as indicated, to and through a drying kiln, K. The switch section of the inclined runway, 1ᵃ, is moved down under the weight of the carrier after the latch is released and as soon as the carrier moves on to the runway 18, as indicated in dotted lines, said switch section 1ᵃ is again raised by the weight 9 and the latch automatically catches and holds it for the next carrier, which does not come to this point until the first carrier or pallet is out of the way.

We claim:

1. Means for moving carriers of the character referred to along a runway one after the other in combination with means for automatically grouping said carriers with their opposite ends on stationary supports at different levels in close overlapping positions.

2. In a machine for handling plaster board and the like, in combination with runways for carriers, coöperating runways for moving said carriers to inclined positions with their upper and lower ends supported at different levels, and means for moving them together in such inclined positions.

3. In a machine for handling plaster board and the like, in combination with runways for carriers therefor, means for moving said carriers one after the other, and means for moving said carriers into inclined positions with their opposite ends at different levels, whereby said carriers can be moved into overlapping positions relative to each other, and means for moving them together, substantially as described.

4. In a machine for handling plaster board and the like, in combination with runways for carriers therefor, means for moving said carriers one after the other on said runways, runways for the opposite ends of said carriers adapted to move them into inclined positions with their opposite ends at different levels, parallel runways to receive the upper and lower ends of said carriers, and means for moving said carriers along said parallel runways, substantially as described.

5. In a machine for handling plaster board and the like, in combination, runways for carriers to move on end to end, parallel runways spaced one above the other, and inclined runways adapted to move said carriers from said first mentioned runways to said parallel runways with one end of said carriers running on the upper of said parallel runways and the lower ends of said carriers running on the lower of said parallel runways, substantially as described.

6. In a machine for handling plaster board, or the like, a plurality of carriers to receive the same, track means for said carriers to move upon with their loads, receiving and storing track means adapted to receive said carriers in inclined positions with their ends supported thereon at different levels, and means for automatically transferring said carriers from said first mentioned track means to said receiving and storing track means.

Signed at Los Angeles, Los Angeles county, California, this 28th day of February, 1919.

ORVILLE L. ROUTT.
GROVER C. McCONNELL.
HERBERT L. GLAZE.

In presence of—
W. R. LITZENBERG,
H. M. BRUNDAGE.